US012358774B2

(12) United States Patent
Jung et al.

(10) Patent No.: US 12,358,774 B2
(45) Date of Patent: Jul. 15, 2025

(54) LIQUID DISPENSER

(71) Applicant: LG ELECTRONICS INC., Seoul (KR)

(72) Inventors: Ji Sun Jung, Seoul (KR); Kwang Yong An, Seoul (KR); Jongwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 614 days.

(21) Appl. No.: 17/578,962

(22) Filed: Jan. 19, 2022

(65) Prior Publication Data

US 2022/0234879 A1 Jul. 28, 2022

(30) Foreign Application Priority Data

Jan. 26, 2021 (KR) ........................ 10-2021-0010595

(51) Int. Cl.
*B67D 1/08* (2006.01)
*B67D 1/00* (2006.01)

(52) U.S. Cl.
CPC ......... *B67D 1/0804* (2013.01); *B67D 1/0859* (2013.01); *B67D 2001/0095* (2013.01)

(58) Field of Classification Search
CPC .. B67D 1/0804; B67D 1/0857; B67D 1/0859; B67D 2001/0095; B67D 2210/0001; B65D 81/38; F25D 23/126; F25D 31/002; F25D 2323/122
See application file for complete search history.

(56) References Cited

U.S. PATENT DOCUMENTS

2011/0006080 A1 1/2011 Naylor et al.
2014/0260412 A1* 9/2014 Keast .................. B67D 1/0857 62/457.9
2015/0225225 A1† 8/2015 Tae
2017/0291807 A1† 10/2017 Jeon

FOREIGN PATENT DOCUMENTS

JP 2017-154790 9/2017
JP 2017-154790 A † 9/2017
KR 10-2012-0044557 5/2012
KR 10-2015-0094235 8/2015
KR 10-2017-0125559 11/2017
KR 10-2019-0053831 5/2019
(Continued)

OTHER PUBLICATIONS

Translation JP2017154790 (Year: 2017).*
(Continued)

*Primary Examiner* — Joseph F Trpisovsky
(74) *Attorney, Agent, or Firm* — KED & ASSOCIATES, LLP

(57) ABSTRACT

A liquid dispenser, such as water purifier, may have a soft insulation material installed in a space between a rigid insulator surrounding a cold water tank assembly and a cover, the cold water tank accommodating a coolant therein and having a passage through which water passes to be cooled through a heat exchange with the coolant, and the soft insulation material thereby removing the space and improving a cooling effect.

19 Claims, 8 Drawing Sheets

(56) References Cited

FOREIGN PATENT DOCUMENTS

| | | |
|---|---|---|
| KR | 10-1977676 | 5/2019 |
| KR | 10-2148635 | 8/2020 |

OTHER PUBLICATIONS

Korean Office Action dated Nov. 29, 2023 issued in Application No. 10-2021-0010595.
Korean Office Action dated Sep. 21, 2022 issued in Application No. 10-2021-0010595.
Korean Office Action dated Apr. 25, 2023 issued in Application No. 10-2021-0010595.

* cited by examiner
† cited by third party

LIQUID DISPENSER

CROSS-REFERENCE TO RELATED APPLICATION

This application claims priority to and the benefit of Korean Patent Application No. 10-2021-0010595, filed in Korea on Jan. 26, 2021, the disclosure of which is incorporated herein by reference in its entirety.

BACKGROUND

1. Field

The present disclosure relates to a liquid dispenser, such as a water purifier, that may prevent dew condensation in inside and outside of a cover provided therein.

2. Background

A water purifier means a device that filters harmful elements such as foreign substances or heavy metals contained in water by physical and/or chemical methods. A water ionizer and a water softener also belong to such a water purifier in a broad sense.

The water purifier may filter raw water and provide purified water to the user, and also provide hot and cold water. To provide the hot and cold water, the water purifier may include a heating device and a cooling device that are provided separately therein. The heating device is configured to provide hot water to the user by heating the purified water, and the cooling device is configured provide cold water to the user by cooling the purified water.

Meanwhile, to generate cold water, the cooling device may heat-exchange a coolant with a refrigerant inside an evaporator using an evaporator. However, when the cooling device operates, dew may be generated outside the cooling device and on a case of the water purifier adjacent to the cooling device. In other words, dew condensation occurs. The generated dew causes malfunction of electronic components installed inside the water purifier and also causes mold. Accordingly, dew condensation has to be prevented.

Related to such dew condensation, Korean Patent No. 10-1977676 (hereinafter, referred to as “the prior art”) is disclosed. FIG. 1 is a diagram illustrating structure of a water purifier according to the prior art. FIG. 1 is an extract of FIG. 3 of the prior art. The reference numerals shown in FIG. 1 are limited to only the components of FIG. 1.

Referring to FIG. FIG. 1, a cold water tank assembly (or cold liquid tank assembly) 1200 may be provided in the water purifier, and the cold water tank assembly 1200 may be corresponding to the cooling device mentioned above. In this instance, a foam insulation member 1210 may be provided to surround the outer peripheral surface of the cold water tank assembly 1200. The foam insulation member 1210 may suppress heat transfer from the coolant accommodated in the cold water tank assembly 1200 to air, thereby lowering the rate at which the temperature of the coolant approaches room temperature, and thus preventing dew formation to some extent.

In addition, the foam insulation member 1210 may be spaced a preset distance apart from a rear cover (or cover) 1014 and a certain space, that is, an air gap 1230 may exist between the foam insulation member 1210 and the rear cover 1014. The air gap 1230 may be formed for additional cooling of the cold water tank assembly 1200.

However, according to the prior art, the thickness of the form insulation member 1210 is not large due to the miniaturization of the water purifier. Accordingly, there is a problem in that dew is formed on the outer circumferential surface of the foam insulation member 1210. In addition, vibration and noise might be generated due to the air gap 1230 during the operation of the water purifier, which might cause inconvenience to the user.

BRIEF DESCRIPTION OF THE DRAWINGS

Embodiments will be described in detail with reference to the following drawings in which like reference numerals refer to like elements, and wherein.

DETAILED DESCRIPTION

Figure 2:
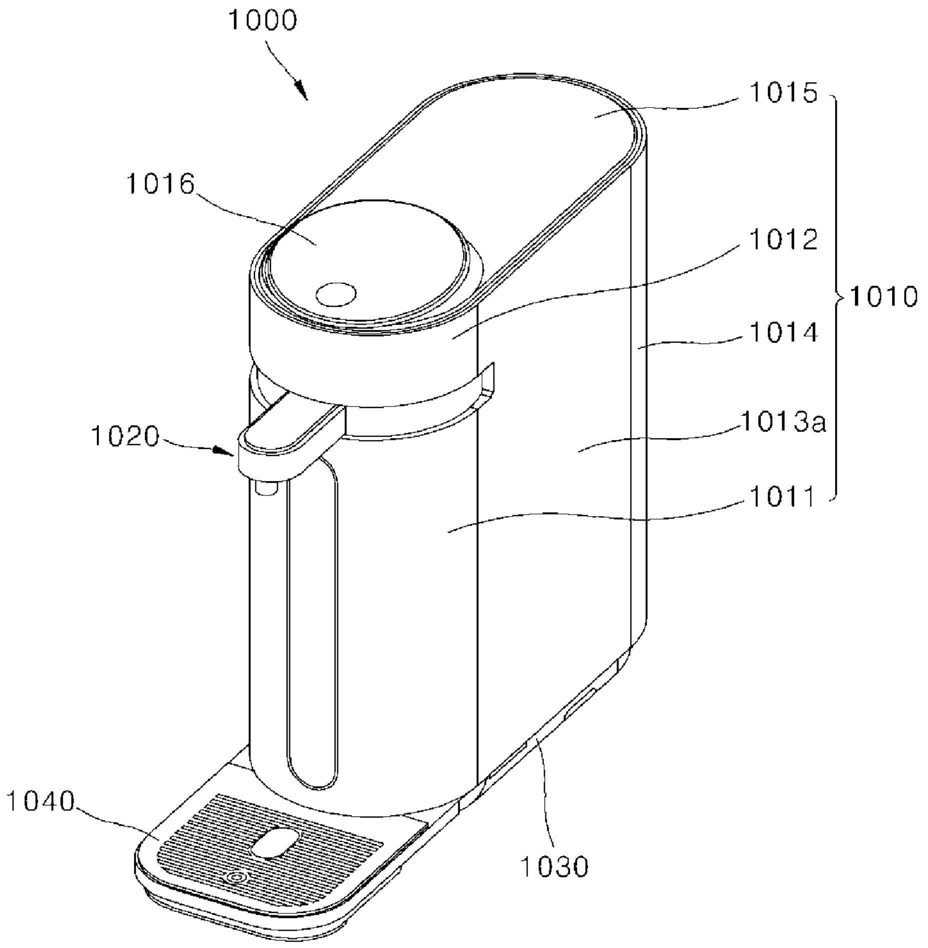
FIG. 2 is a perspective diagram illustrating the exterior of a water purifier according to one embodiment of the present disclosure.

Hereinafter, embodiments of the present disclosure will be described. FIG. 2 is a perspective diagram illustrating the exterior of a water purifier 1000 according to one embodiment of the present disclosure. The water purifier 1000 may include a cover 1010, a water discharge part 1020, a base assembly 1030 and a tray 1040.

The cover 1010 may define the exterior of the water purifier 1000. Most of the components for filtering raw water may be provided in the cover 1010. The cover 1010 may cover the components to protect them. The term of the cover 1010 may be changed into the case or housing when explaining it.

Figure 1:
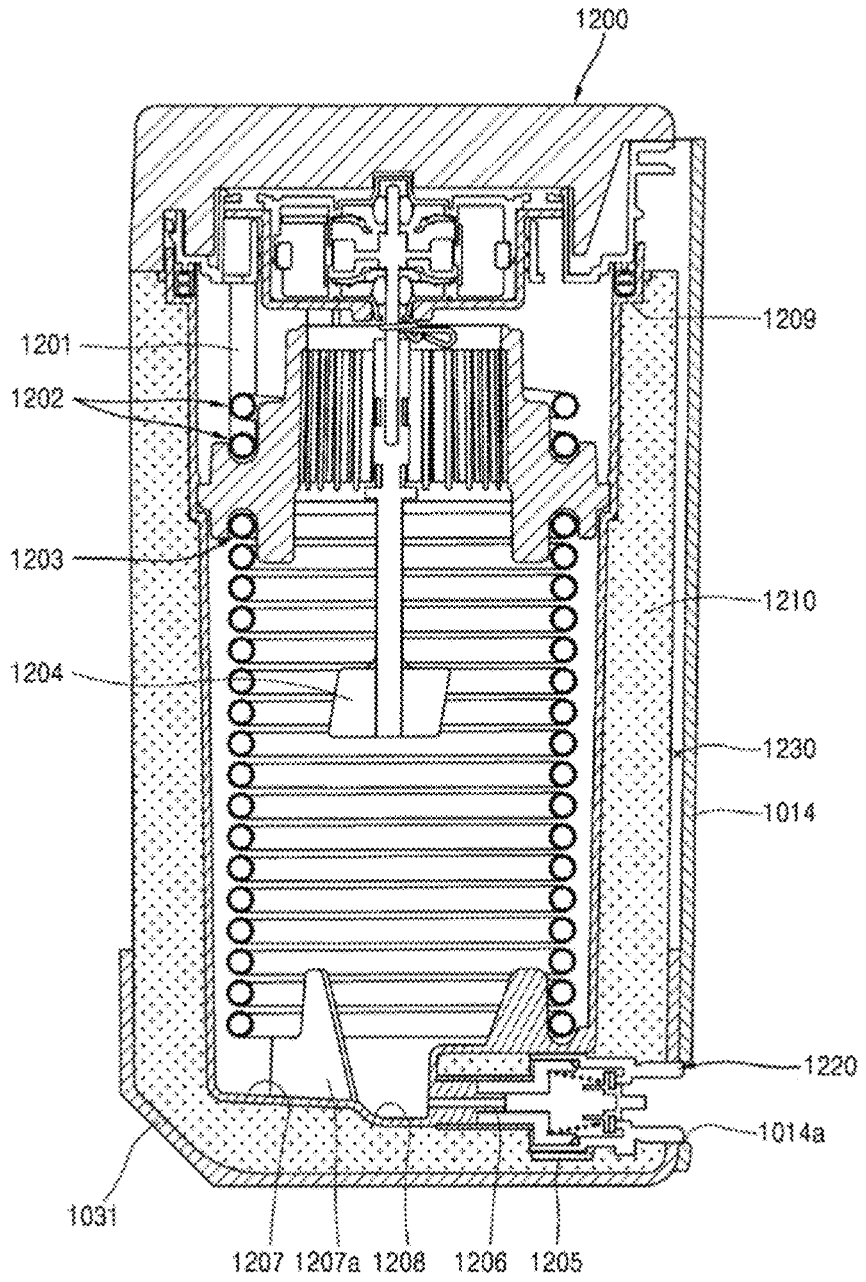
FIG. 1 PRIOR ART
FIG. 1 is a diagram illustrating the structure of a water purifier according to the prior art.

The cover 1010 may be formed as a single component or by combining several components. As one example, the cover may include a front cover 1011, a rear cover (or cover) 1014, a side cover **1013*a* and an upper cover 1012 and a top cover 1015 as shown in FIG. 1**.

The front cover 1011 may be provided in a front portion of the water purifier 1000 and the rear cover 1014 may be provided in a rear portion of the water purifier 1000. In this instance, the terms of the front and rear may be determined based on the direction in which the water discharge part 1020 is viewed from the user’s look, respectively. However, since the concept of the front and rear portions of the water purifier 1000 is not absolute, it may vary based on a method of describing the water purifier 1000. In addition, it is shown in FIG. 2 that the front cover 1011 and the rear cover 1014 have curved surfaces, respectively, and the present disclosure may not be limited thereto.

The side cover **1013*a* may be provided in each of the left and right sides of the water purifier 1000**. The side covers

1013*a* may be disposed between the front cover 1011 and the rear cover 1014. The side cover 1013*a* may be coupled to the front cover 1011 and the rear cover 1014. The side cover 1013*a* may substantially define the lateral surfaces of the water purifier 1000.

The upper cover 1012 may be provided in the front portion of the water purifier 1000. The upper cover 1012 may be installed higher than the front cover 1011. The water discharge part 1020 may be exposed to a space between the upper cover 1012 and the front cover 1011. The upper cover 1012 together with the front cover 1011 may define the exterior of the front surface of the water purifier 1000.

The top cover 1015 may define an upper surface of the water purifier 1000. An input/output unit 1016 may be formed in the top cover 1015. The input/output unit 1016 may be a concept including an input unit and an output unit. The input unit may be configured to receive a control command input by the user through a touch input method, a physical pressure method, or the like. The output unit may provide the user with audio-video information about the state of the water purifier 1000.

The water discharge part (also referred to as a liquid discharge part or cock assembly) 1020 may supply a liquid, such as purified water, cold water and/or hot water to the user based on the control command input by the user. The water discharge part 1020 may be protruded from the water purifier 1000 to supply water. The water discharge part 1020 may be rotatable based on the user's manipulation. The water discharge part 1020 may be rotated within a rotatable range formed between the front cover 1011 and the upper cover 1012.

The base assembly 1030 may define the bottom of the water purifier 1000. The internal components of the water purifier 1000 may be supported by the base assembly 1030. When the water purifier 1000 is put on the floor or shelf, the base assembly 1030 may face the floor or shaft. Accordingly, the structure of the base assembly 1030 may not be exposed outside when the water purifier 1000 is placed on the floor, the shelf or the like.

The tray 1040 may be provided in opposite, while facing each other. Based on the case in which the water purifier 1000 is installed as shown in FIG. 2, the tray 1040 may face the water discharge part 1020 in the vertical direction. The tray 1040 may support the container or the like for containing the purified water discharged through the water discharge part 1020 and the tray 1040 may receive the remaining water falling from the water discharge part 1020. Alternatively, the tray 1040 may be embodied to be rotatable together with the water discharge part 1020.

Figure 3:
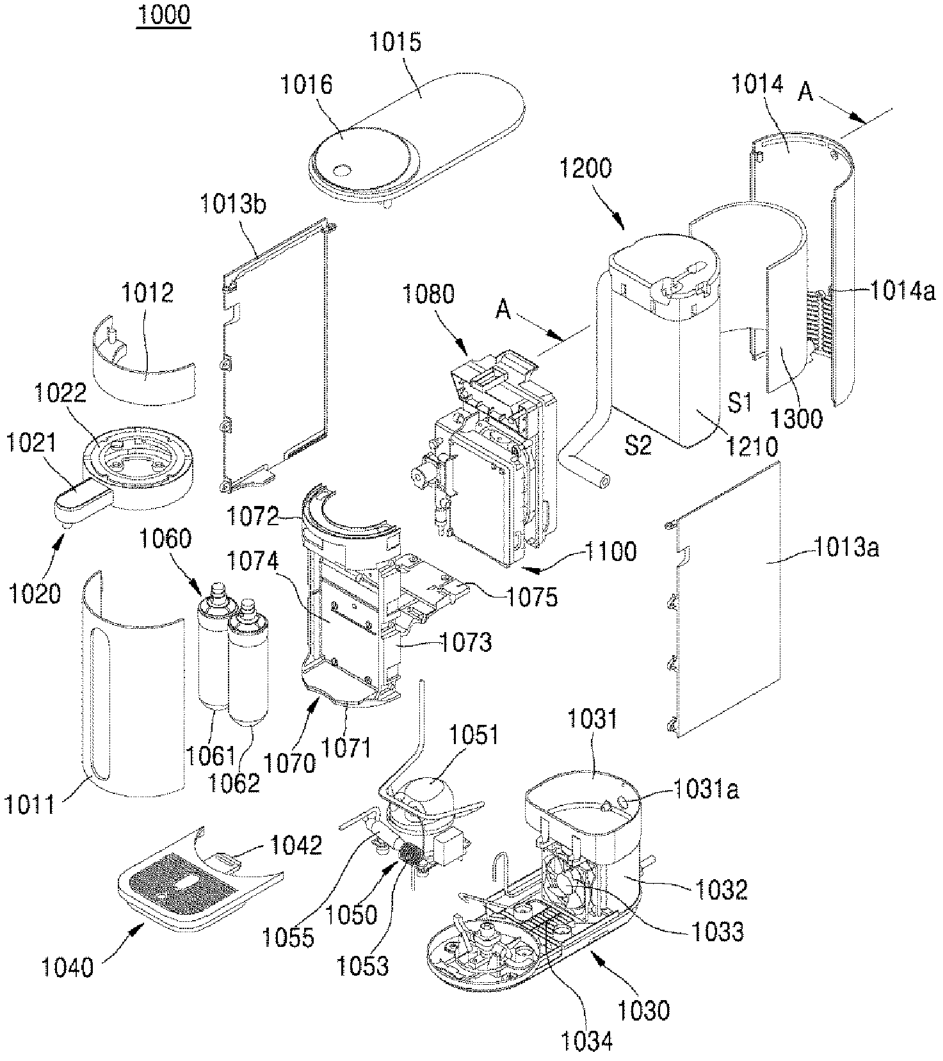
FIG. 3 is an exploded perspective diagram illustrating the internal configuration of the water purifier according to one embodiment.

FIG. 3 is an exploded perspective view illustrating the internal configuration of the water purifier 1000 according to one embodiment. A filter part 1060 may be provided inside the front cover 1011. The filter part 1060 may be configured to filter raw water and generate purified water. Since it can be difficult to generate purified water suitable for driving with only one filter, the filter part 1060 may include a plurality of unit filters 1061 and 1062. For example, the unit filters 1061 and 1062 may include a pre-filter such as a carbon block or an adsorption filter, and a high-performance filter such as a HEPA filter or a UF filter.

The purified water generated by the filter part 1060 may be provided through the water discharge part 1020. In this instance, the temperature of the purified water provided to the user may be room temperature. Alternatively, the purified water generated by the filter part 1060 may be turned into hot water or by an induction heating module 1100 or cold water by the cold water tank assembly 1200.

A filter bracket assembly 1070 may be the structure for secure the unit filters 1061 and 1062 of the filter part 1060, the water outlet path for purified water or cold water, a valve and the like. A lower end of the filter bracket assembly 1070 may be coupled to the tray 1040. The lower end of the filter bracket assembly 1070 may accommodate a protrusion coupling portion 1041. As the protruded coupling portion 1041 of the tray 1041 is inserted in the lower end 1071 of the filter bracket assembly 1070, the filter bracket assembly 1070 and the tray 1040 may be coupled to each other.

The lower end 1071 of the filter bracket assembly 1070 and the tray 1040 may have curved surfaces corresponding to each other. The lower end 1071 of the filter bracket assembly 1070 may be rotatable independently from the other parts.

An upper end 1072 of the filter bracket assembly 10070 may support the water discharge part 1020. The upper end 1072 of the filter bracket assembly 1070 may form a rotation path of the water discharge part 1020. The water discharge part 1020 may be divided into a first portion 1021 protruded outside the water purifier 1000 and a second portion 1022 disposed in the water purifier 1000. The second portion 1022 may be mounted on the upper end 1072 of the filter bracket assembly 1070. The upper end 1072 of the filter bracket assembly 1070 may be rotatable independently from the other parts.

The lower end 1071 and the upper end 1072 of the filter bracket assembly 1070 may be connected with each other by a vertical connection portion 1073. A filter installation area 1074 may be formed between the lower end 1071 and the upper end 1072 to accommodate the unit filters 1061 and 1062 of the filter part 1060.

A support 1075 protruding toward the rear surface of the water purifier 1000 may be formed on the opposite side of the filter installation area 1074. The support 1075 may support the control module 1080 and the induction heating module 1100. The control module 1080 and the induction heating module 1100 may be mounted on the support 1075. The support 1075 may prevent heat formed in the induction heating module 1100 from being conducted to the compressor assembly 1050 or the like.

A control module 1080 may be configured to implement overall control of the water purifier 1000. Various circuit boards for controlling the operation of the water purifier 1000 may be embedded in the control module 1080.

The induction heating module 1100 may heat the purified water generated by the filter part 1060 and generate hot water. The induction heating module 1100 may include components for heating the purified water in an induction heating method. The induction heating module 1100 may be supplied the purified water from the filter part 1060 and the hot water generated by the induction heating module 1100 may be discharged through the water discharge part 1020.

The induction heating module 1100 may include a printed circuit board configured to control the hot water generation. A protection cover 1161 may be coupled to one side of the induction heating module 1100 to prevent water from penetrating into the printed circuit board and protecting the printed circuit board if a fire occurs.

A compressor assembly 1050 may include a compressor and disposed under the support 1075. The compressor may be driven for the compression process of a refrigeration cycle performed in the cold water tank assembly 1200. A refrigerant path and the like may be connected to the compressor to connect the components for the refrigeration cycle with each other. The mechanisms including the compressor, the refrigerant path and the like may be connected with each other, and thus form the compressor assembly 1050.

The compressor assembly 1050 may be supported by the base assembly 1030. The base assembly 1030 may support not only the compressor assembly 1050 but also the front cover 1011, the rear cover 1014, the side cover 1013 and 1013*b,* the filter bracket assembly 1070, a condenser 1032, a fan 1033 and the like. To support those components, the base assembly 1030 may have high rigidity.

Especially, the condenser 1032 and the fan 1033 may be provided in the rear area of the water purifier 1000. The base assembly 1030 may have an air inlet hole 1034 for dissipate heat from the condenser 1032. The air drawn via the air inlet hole 1034 may be moved toward the condenser 1032 by the fan 1033 and then cool the condenser 1032.

A pedestal 1031 may be provided on the condenser 1032 to support the cold water tank assembly 1200. The pedestal 1031 may include a first hole 1031*a* in a rear area and the rear cover 1014 may have a second hole 1014*a*. The first hole 1031*a* and the second hole 1014*a* may be formed in the positions corresponding to each other. The first hole 1031*a* and the second hole 1014*a* may be configured to arrange a discharge valve for discharging the coolant filled in the cold water tank assembly 1200.

The condenser 1032 together with the compressor of the compressor assembly 1050 may realize the refrigeration cycle. The condensation of the refrigerant may be performed in the condenser 1032.

The cold water tank assembly 1200 may cool the purified water (the filtered raw water) supplied from the filter part 1060, and then generate cold water. For that, the cold water tank assembly 1200 may accommodate the coolant and an evaporator 1202 (see FIG. 4) may be provided in the cold water tank assembly 1200.

The temperature of the coolant filled in the cold water tank assembly 1200 may be lowered by the operation of the refrigeration cycle. The coolant circulated not stored in the cold water tank assembly 1200, so that the degree of contamination of the coolant is likely to increase after a long time. Accordingly, the coolant water accommodated in the cold water tank assembly 1200 has to be periodically replaced for hygiene, and for this purpose, a valve and a pipe for discharging the cold water may be provided.

A rigid insulator (also referred to as a first insulator or a rigid insulation member) 1210 may be disposed on the outer circumferential surface of the cold water tank assembly 1200. Specifically, the rigid insulator 1210 may be provided to surround the outer circumferential surface of the cold water tank assembly 1200. The outer circumferential surface of the cold water tank assembly 1200 may have the same shape as that of the rigid insulator.

Due to the low temperature of the coolant filled in the cold water tank assembly 1200, a large temperature difference might occur between the inside and the outside of the cold water tank assembly 1200. The large temperature difference may result in dew condensation (a phenomenon in which dew is generated) occurring on the outer circumferential surface of the cold water tank assembly 1200. Accordingly, the rigid insulator 1210 may be provided to surround the cold water tank assembly 1200 to prevent such the dew condensation. In addition, the rigid insulator 1210 may prevent the temperature of the coolant from increasing, and also prevent the temperature of the cold water from increasing.

The rigid insulator 1210 may be made of a PU (Polyurethane) material, and formed by a forming process. A conventional EPS (Expandable Polystyrene) heat insulating material has been used for cooling water purifies, etc., but since holes exist in EPS, air contact cannot be blocked. However, PU has better thermal insulation performance than EPS, because there are no holes.

The rigid insulator 1210 may include a first surface S1 and a second surface S2. The first surface S1 of the rigid insulator 1210 may be provided in opposite to the rear cover 1014. Since the rear cover 1014 is curved, the first surface S1 of the rear cover 1014 may be also curved. The second surface S2 of the rigid insulator 1210 may be arranged toward the induction heating module 1100.

A soft insulator (also referred to as a second insulator or a soft insulation member) 1300 may be provided between the rear cover 1014 and the rigid insulator 1210. A space may exist between the rigid insulator 1210 and the rear cover 1014, and the soft insulator 1300 may be disposed inside the space. The space corresponding to the air gap shown in FIG. 1. The soft insulator 1300 may have the same shape as the rear cover 1014 and the first surface of the rigid insulator 1210. That is, the soft insulator 1300 may also have the curved shape. Since the soft insulator 1300 is disposed in the space, the space can be removed. The soft insulator 1300 may be replaceable.

The soft insulator 1300 may also prevent the occurrence of the dew condensation together with the hard insulation member 1210, and keep the temperature of the cold water cool. The soft insulator 1300 may be made of the same or similar material as the rigid insulator 1210, and it may be an insulation material with a difference in strength. As one example, the soft insulator 1300 and the hard insulation member 1210 may be made of Polyurethane (PU). The soft insulator 1300 may have somewhat lower thermal conductivity than the hard insulation member 1210, but have a property of being easily restored even if it is deformed by an external force.

Figure 4:
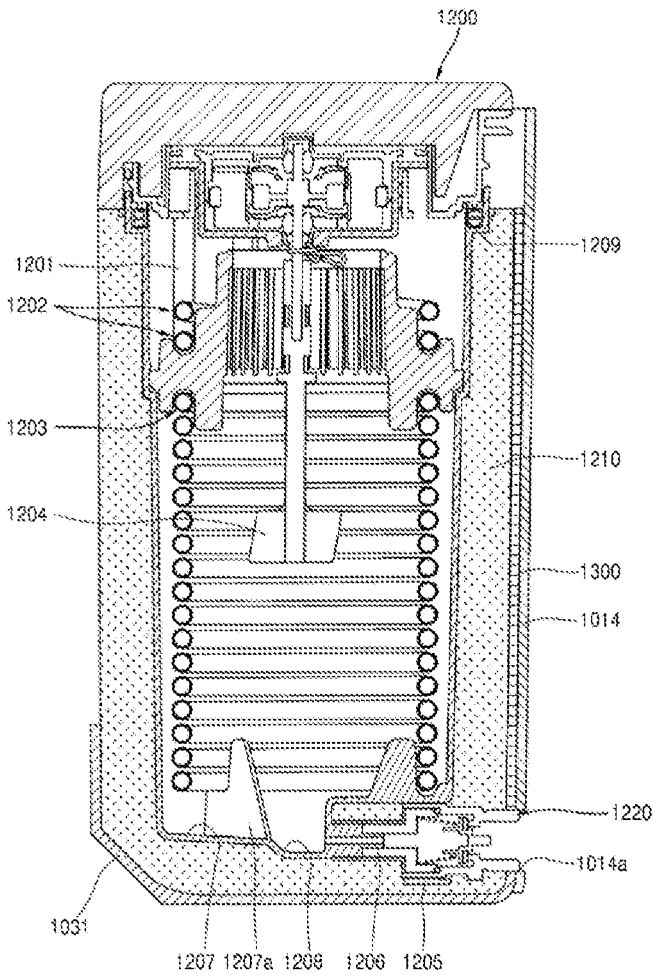
FIG. 4 is a sectional diagram of a cold water tank assembly and a rear cover shown in FIG. 3 along A-A'.

Hereinafter, the configuration of the cold water tank assembly 1200, the rigid insulation 1210 and the soft insulator 1300 will be described in detail. FIG. 4 is a sectional diagram of the cold water tank assembly 1200 and the rear cover 1014 shown in FIG. 3 along A-A'. A thermistor 1201 may be provided in the cold water tank assembly 1200 and configured to measure the temperature of the coolant. The thermistor 1201 may measure the temperature of an object, that is, the coolant by using the characteristic that the resistance value changes based on the temperature. The temperature of the coolant measured by the thermistor 1201 may be compared with the reference temperature, and it may be determined whether the refrigeration cycle operates based on the result of the comparison.

An agitator (or stirrer) 1204 may be provided in the cold water tank assembly 1200 and the agitator 1204 may be rotatable about an axis in the cold water tank assembly. The agitator 1204 may be a mechanism configured to promote heat exchange between fluids inside the cold water tank assembly 1200.

A cooling coil 1203 may be a path through which the purified water passes. The cooling coil 1203 may be disposed in the cold water tank assembly 1200 and submerged in the coolant. The purified water passing through the cooling coil 1203 is heat-exchanged with the coolant. The heat is transferred from the purified water to the coolant, and the purified water becomes cold water within a short time by heat-exchanging with the coolant. The agitator 1204 rotates about its axis to promote heat-exchange between the purified water and the coolant.

A supporting portion (or support) 1207*a* may be provided to support the cooling coil 1203. The supporting portion 1207*a* may be protruded from the inner bottom surface 1207 of the cold water tank assembly 1200 toward the cooling coil 1203. The supporting portion 1207*a* may include a groove having the same size as the outer circumferential surface of the cooling coil 1203. The cooling coil 1203 may be mounted in the groove of the supporting portion 1207*a* and supported by the supporting portion 1207*a*.

A coolant discharge valve 1220 may be configured to discharge the coolant to replace the coolant. The coolant discharge valve 1220 may be connected to the cold water tank assembly 1200. The coolant discharge valve 1220 may be protruded from the cold water tank assembly 1200 to form the discharge channel of the coolant filled in the cold water tank assembly 1200.

The cold water tank assembly 1200 may include protruded water discharge path 1206. The protruded water discharge path 1206 may be protruded from the lower area of the cold water tank assembly 1200 to be connected to the coolant discharge valve 1220. When the protruded water discharge path 1206 is inserted in the coolant discharge valve 1220, the path for discharging the coolant stored in the cold water tank assembly 1200 may be formed.

The coolant discharge valve 1220 may be secured by a securing portion (or securing opening) 1205. The inner bottom surface 1207 of the cold water tank assembly 1200 may be inclined for smooth discharge.

A stagnant prevention discharge portion (or stagnant prevention discharge recess) 1208 may form the water discharge path together with the coolant discharge valve 1220. The stagnant prevention discharge portion 1208 may have a lower bottom surface than the inner bottom surface 1207 and have an inclination, so that the coolant may not accumulate or be stagnant in the inner bottom surface 1207. The coolant may be collected in the stagnant prevention discharge portion 1208 and discharged through the coolant discharge valve 1220.

Figure 5:
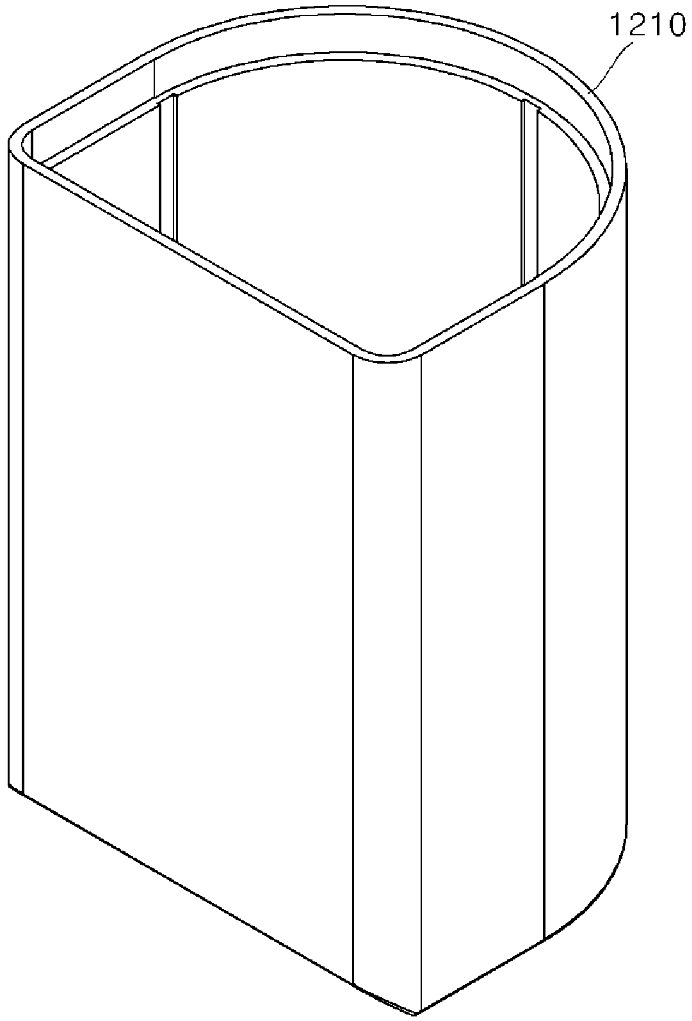
FIG. 5 is a perspective diagram illustrating a rigid insulator according to one embodiment.

The rigid insulator 1210 may primarily insulate the cold water tank assembly 1200. The rigid insulator 1210 may surround the outer circumferential surface of the cold water tank assembly 1200. FIG. 5 is a perspective diagram of the rigid insulator 1210. The thickness of the rigid insulator 1210 may be determined in consideration of the temperature of the coolant and the size of the water purifier 1000 or the cold water tank assembly 1200. As one example, when the temperature of the coolant is −2.5° C.~1.0° C., the thickness of the rigid insulator 1210 may be 17 mm.

Figure 6:
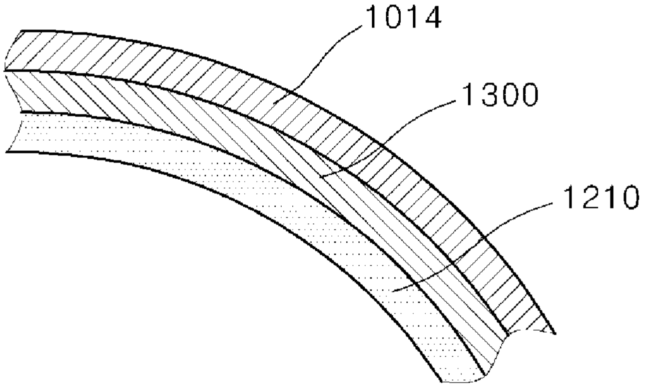
FIG. 6 is a plane view illustrating a soft insulator disposed in a space between the rear cover and the rigid insulator according to one embodiment; and FIGS. **7*a* and 7*b*** are a sectional diagram of the shape along A-A' of which a heat diffusion material attached to at least predetermined portion of the other end of the soft insulator.

The soft insulator 1300 may secondarily insulate the cold water tank assembly 1200. The soft insulator 1300 may be provided between the rigid insulator 1210 and the rear cover 1014. FIG. 6 is a plane view of the soft insulator 1300 provided in the space between the rigid insulator 1210 and the rear cover 1014.

Especially, one end (or first surface) of the soft insulator 1300 may be in contact with the first surface S1 of the rigid insulator 1210 and the other end (or second surface) of the soft insulator 1300 may be in contact with the inner surface of the rear cover 1014. In other words, the soft insulator 1300 may be inserted in the space. Accordingly, the space may be removed by the soft insulator 1300 and the rigid insulator 1210 may not be contact with air.

As one example, the soft insulator 1300 may be attached to the first surface S1 of the rigid insulator 1210 or the inner surface of the rear cover 1014. The attachment of the soft insulator 1300 may be realized by an adhesive. Due to the disassembling for maintenance of the water purifier 1000 and the structure of the inner surface composing the rear cover 1014, it may be preferred that the soft insulator 1300 is attached to the first surface S1 of the rigid insulator 1210.

The soft insulator 1300 may be attached to the first surface S1 of the rigid insulator 1210 or at least predetermined area of the inner surface of the rear cover 1014. Especially, when it is attached to the first surface S1 of the rigid insulator 1210, the soft insulator 1300 may be attached to the entire area of the first surface S1 or a predetermined area of the first surface S1.

In this instance, the temperature of an area (i.e., an upper area) of the cold water tank assembly 1200 in which the evaporator 1202 is provided may be the lowest and dew condensation could occur most in that area. Accordingly, when the soft insulator 1300 is attached to the predetermined area of the first surface S1 of the rigid insulator 1210, the attached area of the soft insulator 1210 may be a first area (i.e., the upper area) of the first surface of the rigid insulator 1210 corresponding to the installation position of the evaporator 1202.

Hereinafter, aspects of using the rigid insulator 121 and the soft insulator 1300 at the same time will be described as follows. Assuming that the average temperature of the water in the cold water tank provided in the water purifier according to the prior art shown in FIG. 1, the thickness of the form insulation member should be 26 mm or more. However, due to the miniaturization of the water purifier, the form insulation member will not be formed thickly, but formed to be about 17 mm. Dew condensation might occur due to the non-thick foam insulation material, and the water purifier of the prior art may additionally cool the cold water tank assembly by using an air gap formed between the foam insulation member and the rear cover.

However, there was a problem in that dew was generated on the outer circumferential surface of the foam insulation member once the foam insulation member meets the air present in the air gap. Also, there was a problem in that the air gap is likely to generate vibration and noise when the water purifier was driven.

Accordingly, in the water purifier 1000 according to one embodiment, the soft insulator 1300 may be provided in the space between the rigid insulator 1210 and the rear cover 1014. Then, the space may be removed and the dew condensation inside the water purifier 1000 can be fundamentally blocked. Since the soft insulator 1300 has lower thermal conductivity than air, the cooling effect of the cold water tank assembly 1200 may be increased.

In addition, the soft insulator 1300 may contact with the rear cover 1014 and the space may be removed. Accordingly, there may be an advantage in that vibration and noise may be reduced when the water purifier 1000 is driven. Also, the assembling of the rear cover 1014 and the cold water tank assembly 1200 may be facilitated due to the characteristic of the soft insulator 1300 that is easily restored even after being deformed. In addition, since the soft insulator 1300 is attached with an adhesive or the like, there is an advantage in that is easy to replace the soft insulator 1300 during A/S of the water purifier 1000.

As mentioned above, the temperature of the area (i.e., the upper area) of the cold water tank assembly 1200 in which the evaporator 1202 is installed may be the lowest, and the temperature of the predetermined area of the rear cover 1013 may be also lowered. In this instance, dew could be generated on the outer circumferential surface of the rear cover 1014. To prevent such dew generation, a thermal diffusion member (or thermal diffusion layer) 1310 (see FIG. 7) may be attached to at least predetermined area of the one or the other end of the soft insulator 1300. Especially, it may be preferred that the terminal diffusion member 1310 is attached to the other end of the soft insulator 1300.

According to one embodiment, the thermal diffusion member 1310 may be a metal tape having high thermal conductivity. As one example, the metal tape may be an aluminum tape having excellent workability.

Figure 7A:
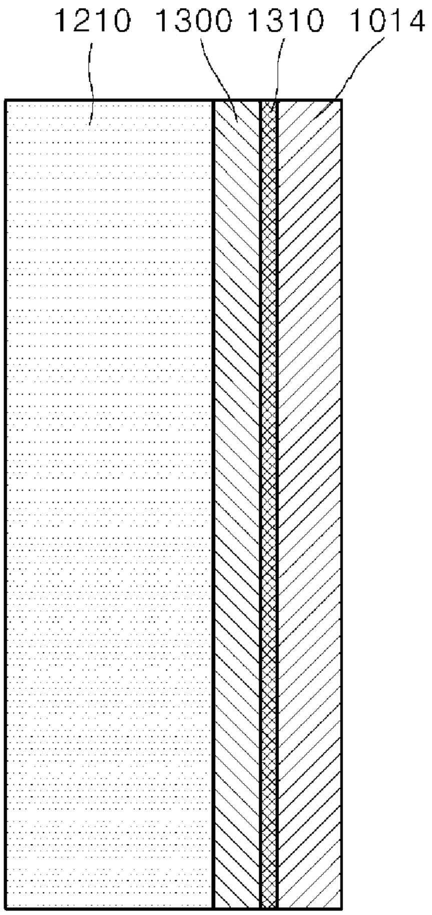
Figure 7B:
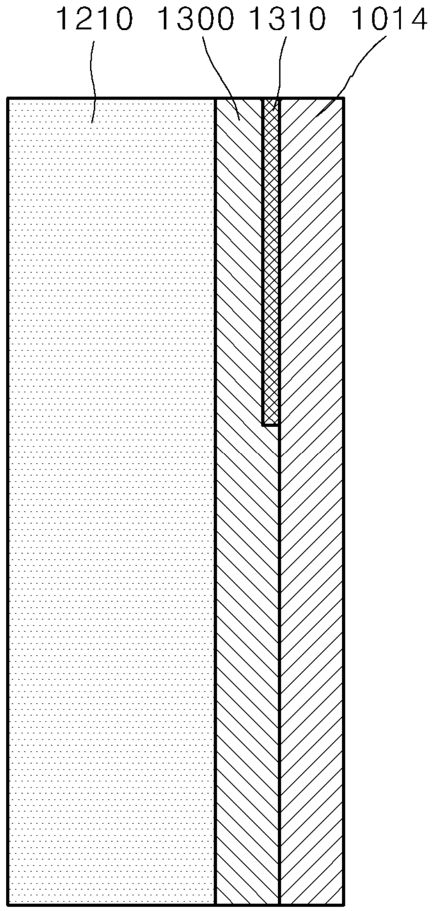

FIGS. 7*a* and 7*b* are sectional diagrams of the thermal diffusion member 1310, in other words, the aluminum tape attached to at least predetermined area of the other end of the soft insulator 1300 along A-A'. At this time, the aluminum tap shown in FIGS. 7*a* and 7*b* is somewhat thick but it is only for easy description. The aluminum tape may be thin.

FIG. 7*a* illustrates that the aluminum tap is attached to the entire area of the other end of the soft insulator 1300. FIG. 7*b* illustrates that the aluminum tape is attached to the area of the soft insulator 1300 corresponding to the upper area of the other end (i.e., the installation position of the evaporation 1202) of the soft insulator 1300.

The aluminum tape may be attached to at least predetermined area of the one end or the other end of the soft insulator 1300, so that heat may be diffused from the area of the cold tank assembly 1200 in which the evaporator 1202 is installed and the temperature of the area may be heat-diffused. Accordingly, the temperature of the area may be heightened enough to prevent the dew condensation generated on the outer circumferential surface of the rear cover 1014.

In brief, the water purifier 1000 according to one embodiment may have the soft insulator 1300 disposed between the rigid insulator 1210 and the rear cover 1014, and the heat diffusion member 1310 attached to at least predetermined area of the one or other end of the soft insulator 1300. Accordingly, the cooling effect of the cold water tank assembly 1200 may be enhanced even without increasing the thickness of the rigid insulator 1210. Also, the problems caused by the formation of the air gap, that is, the dew condensation the rear cover 1014 and the vibration and noise during the driving of the water purifier 1000 may be prevented. In addition, the dew condensation generated on the outside of the rear cover 1014 may be prevented by using the thermal diffusion member 1310.

One aspect of the present disclosure provides a water purifier that may prevent the dew condensation generated inside and outside the cover provided therein. A further aspect of the present disclosure provides a water purifier that may reduce vibration and noise generated during the operation of the water purifier. A still further aspect of the present disclosure provides a water purifier that may improve cooling efficiency of a cooling tank assembly provided therein. A still further aspect of the present disclosure provides a water purifier that may facilitate the assembly of the cold water tank assembly and the cover. Aspects according to the present disclosure are not limited to the above ones, and other aspects and advantages that are not mentioned above can be clearly understood from the following description and can be more clearly understood from the embodiments set forth herein.

Embodiments of the present disclosure may provide a water purifier having a soft insulator installed in a space between a rigid insulator surrounding a cold water tank assembly and a cover, thereby removing the space and improving a cooling effect. In addition, the water purifier according to one embodiment may include a thermal diffusion member provided in at least predetermined area of the soft insulator, thereby increasing the temperature of the outside of the cold water tank assembly or rigid insulator.

Embodiments of the present disclosure may also provide a water purifier including a case comprising a plurality of covers; a filter provided in the case and configured to filter raw water; a cold water tank assembly provided in the case and configured to accommodate coolant therein and cool the filtered raw water by using the coolant and generate cold water; a rigid insulator surrounding an outer surface of the cold water tank assembly; and a soft insulator provided in a space formed between the rigid insulator and a first cover disposed adjacent to the cold water tank assembly among the plurality of covers, wherein one end of the soft insulator is in contact with the rigid insulator and the other end of the soft insulator is in contact with the first cover.

According to the present disclosure, the soft insulator may be provided in the space (i.e., the air gap) formed between the rigid insulator and the cover and heat may be suppressed from being transferred to air, thereby preventing the dew condensation generated in the water purifier. In addition, a vibration and noise generated during the operation of the water purifier may be suppressed by removing the air gap.

Further, according to the present disclosure, the thermal diffusion member may be attached to at least predetermined area of the soft insulator, so that the temperature of the cold water tank assembly or the rigid insulator may be increased, thereby preventing the dew condensation more. Still further, according to the present disclosure, the soft insulator may be disposed in the space (i.e., the air gap) between the rigid insulator and the cover, thereby facilitating the assembling of the cold water tank assembly having the rigid insulator surrounding the outer surface thereof to the cover.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser comprising:

a case including a plurality of covers;

a cold liquid tank assembly provided in the case and configured to accommodate a coolant therein and to cool a liquid using the coolant;

a first insulator surrounding an outer surface of the cold liquid tank assembly; and a second insulator provided in a space formed between the first insulator and a first cover positioned adjacent to the cold liquid tank assembly among the plurality of covers, wherein the first insulator is relatively more rigid than the second insulator, wherein the second insulator insulates the cold liquid tank assembly and reduces vibration and noise when the liquid dispenser is driven, and wherein the first insulator and the second insulator are made of Polyurethane (PU).

2. The liquid dispenser of claim 1, wherein the second insulator is attached to a predetermined area of a first surface of the first insulator facing the first cover.

3. The liquid dispenser of claim 2, wherein:

the first cover and the first surface of the first insulator have respective curved shapes, and the second insulator has a shape corresponding to the first cover and the first surface of the first insulator.

4. The liquid dispenser of claim 2, further comprising an evaporator provided in the cold liquid tank assembly, wherein the second insulator is attached to a first area of the first surface of the first insulator, the first area corresponding to an installation position of the evaporator.

5. The liquid dispenser of claim 1, wherein the second insulator is attached to a predetermined area of an inner surface of the first cover.

6. The liquid dispenser of claim 1, further comprising:

a thermal diffusion layer attached to a predetermined area of the second surface of the second insulator.

7. The liquid dispenser of claim 6, wherein the thermal diffusion layer is a metal tape.

8. The liquid dispenser of claim 7, wherein the metal tape is an aluminum tape.

9. The liquid dispenser of claim 6, further comprising an evaporator provided in the cold liquid tank assembly, wherein:

the second insulator is attached to an entire area of a first surface of the first insulator facing the first cover, and the thermal diffusion layer is attached to a first area of the second surface of the second insulator, the first area corresponding to an installation position of the evaporator.

10. The liquid dispenser of claim 1, further comprising:

a thermal diffusion layer attached to a predetermined area of one surface of the second insulator.

11. The liquid dispenser of claim 1, wherein the second insulator is configured to be removable or to be replaceable from the space.

12. The liquid dispenser of claim 1, further comprising:

a filter provided in the case and configured to filter the liquid.

13. The liquid dispenser of claim 1, wherein the second insulator has a lower thermal conductivity than the first insulator.

14. A liquid dispenser comprising:

a cooled liquid tank assembly configured to accommodate a coolant therein, a liquid being cooled when passed through a passage positioned in the coolant;

a first insulator surrounding an outer surface of the cold liquid tank assembly;

a second insulator provided at an outer surface of the first insulator; and a cover provided at an outer surface of the second insulator, wherein the first insulator is relatively more rigid than the second insulator, wherein the second insulator has a curved shape that corresponds to the outer surface of the first insulator and an inner surface of the cover, wherein the second insulator insulates the cooled liquid tank assembly and reduces vibration and noise when the liquid dispenser is driven, and wherein the first insulator and the second insulator are made of Polyurethane (PU).

15. The liquid dispenser of claim 14, further comprising an evaporator provided in the cold liquid tank assembly, wherein a section of the second insulator is attached to at least one of the outer surface of the first insulator or the inner surface of the cover, a location of the section of the second insulator corresponding to a position of the evaporator in the cold liquid tank assembly.

16. The liquid dispenser of claim 14, wherein the second insulator is coupled to a portion of the outer surface of the first insulator.

17. The liquid dispenser of claim 14, wherein the second insulator is coupled to a portion of the inner surface of the cover.

18. The liquid dispenser of claim 14, further comprising:

a thermal diffusion layer provided between the second insulator and the cover.

19. The liquid dispenser of claim 18, further comprising an evaporator provided in the cold liquid tank assembly, wherein:

the second insulator extends to cover the outer surface of the first insulator, and the thermal diffusion layer covers a portion of the outer surface of the second insulator, a location of the portion corresponding to an installation position of the evaporator.

* * * * *